United States Patent [19]

Kojima et al.

[11] Patent Number: 4,486,837
[45] Date of Patent: Dec. 4, 1984

[54] APPARATUS FOR CONTROLLING OPERATION OF AUTOMOBILE AIR CONDITIONER

[75] Inventors: Yasuhumi Kojima, Gifu; Akiro Yoshimi, Kariya; Michihiko Kamiya, Handa; Fumio Ootsuka, Gifu; Takeo Matsushima, Toyota, all of Japan

[73] Assignees: Nippondenso Co., Ltd., Kariya; Toyota Jidosha Kogyo Kabushiki Kaisha, Toyota, both of Japan

[21] Appl. No.: 348,299

[22] Filed: Feb. 12, 1982

[30] Foreign Application Priority Data

Feb. 17, 1981 [JP] Japan .................... 56-22634

[51] Int. Cl.³ .................... G06F 15/20; B60H 3/00
[52] U.S. Cl. .................... 364/424; 165/42; 236/91 D; 364/418
[58] Field of Search ......... 364/418, 424, 425, 505; 98/2, 2.01; 165/41, 42; 237/5, 28, 32

[56] References Cited

U.S. PATENT DOCUMENTS

| | | | |
|---|---|---|---|
| 4,204,255 | 5/1980 | Cremer | 364/425 |
| 4,259,722 | 3/1981 | Iwata et al. | 364/424 |
| 4,311,188 | 1/1982 | Kojima et al. | 165/2 |
| 4,316,251 | 2/1982 | Saito et al. | 237/5 |
| 4,358,050 | 11/1982 | Naganoma et al. | 165/42 |
| 4,378,087 | 3/1983 | Sakurai et al. | 165/42 |

*Primary Examiner*—Felix D. Gruber
*Attorney, Agent, or Firm*—Cushman, Darby & Cushman

[57] ABSTRACT

An apparatus for controlling the operation of an automobile air conditioner comprises mode switches which permit selection between a manual control mode and an automatic control mode for the control of the flow rate of the conditioned air, and a digital computer incorporating therein a memory which memorizes the selected control mode in accordance with signals received from the mode switches. The digital computer is constituted to give instructions to control members of the air conditioner for controlling in accordance with the values stored in the memory, and to set in the memory a value representing the automatic control mode so as to operate the air conditioner in the automatic control mode when a main switch of the air conditioner is turned on.

3 Claims, 3 Drawing Figures

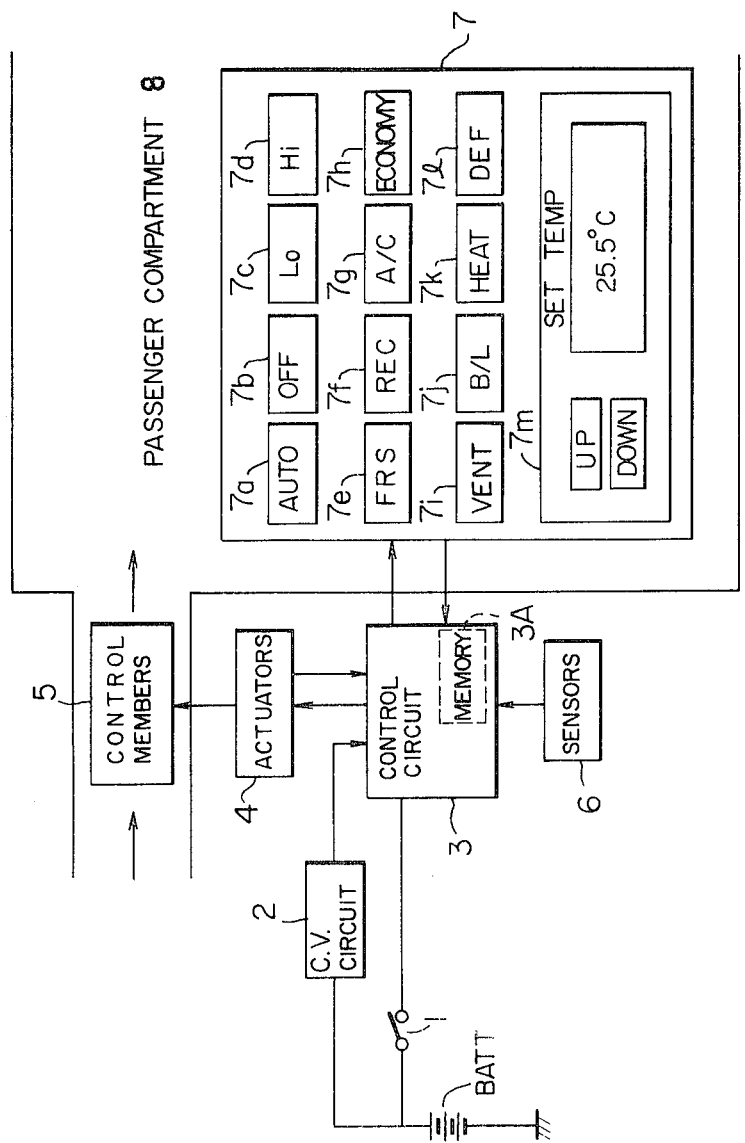

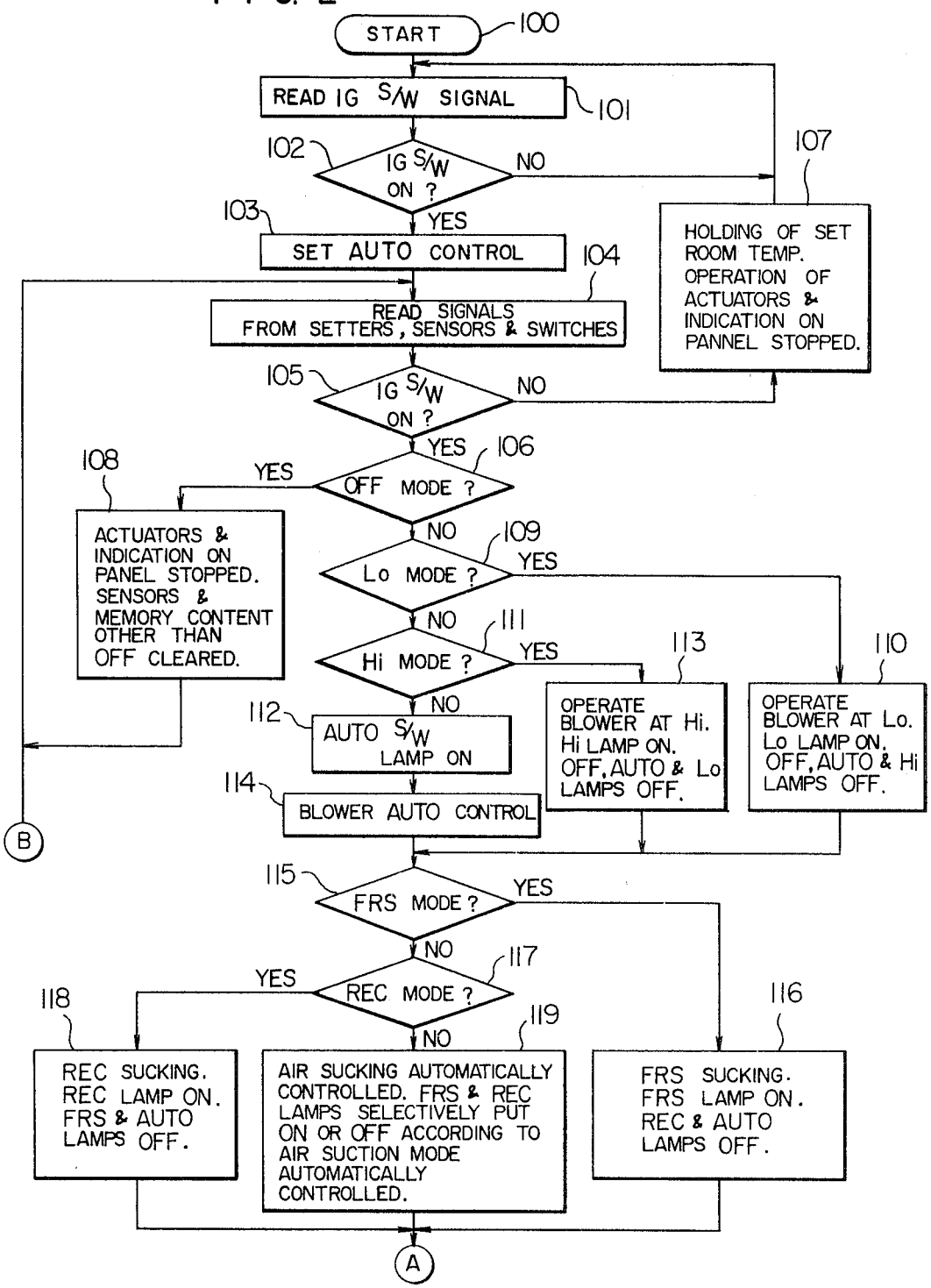

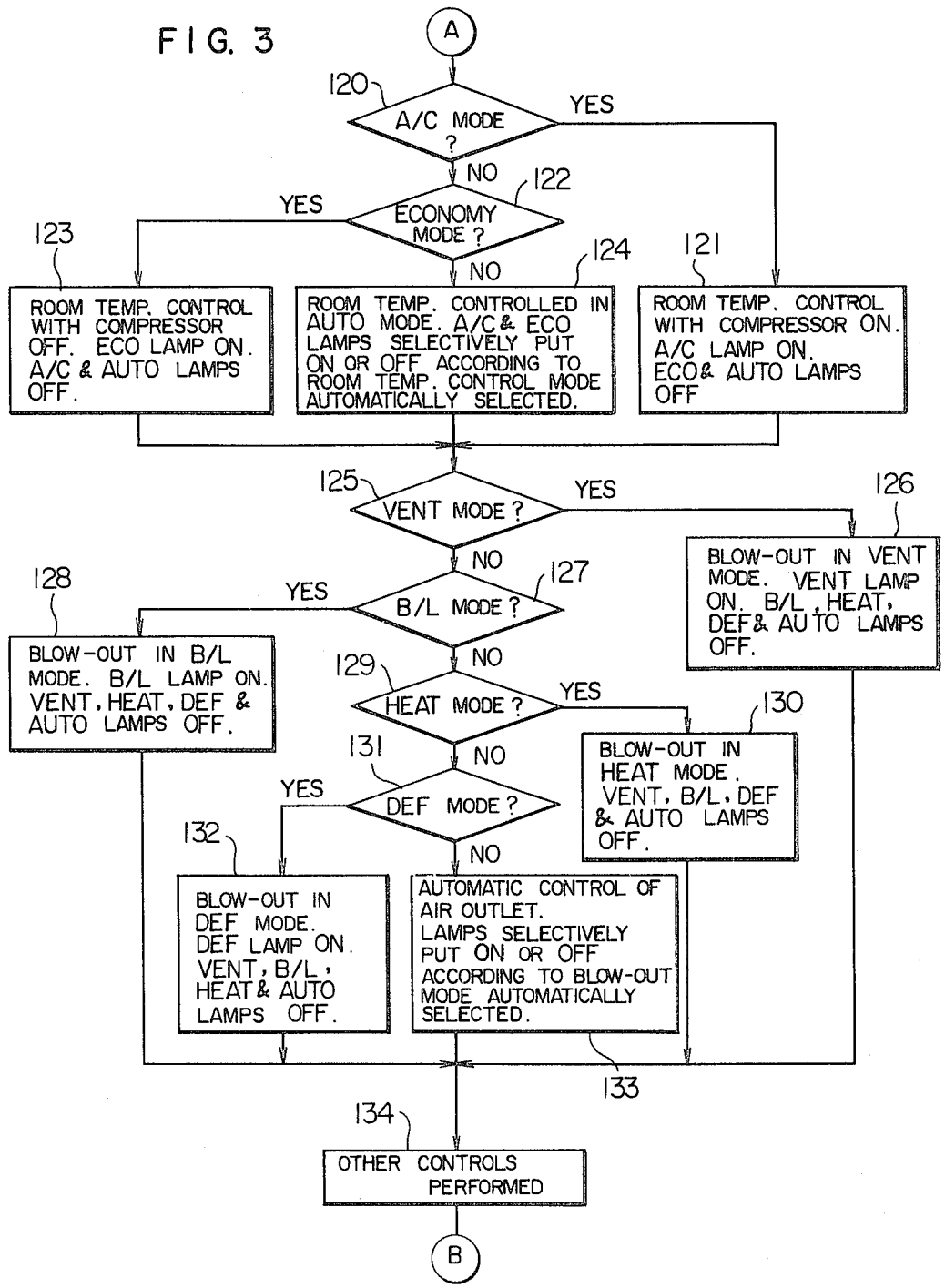

APPARATUS FOR CONTROLLING OPERATION OF AUTOMOBILE AIR CONDITIONER

BACKGROUND OF THE INVENTION

1. Field of the Invention

The present invention relates to an apparatus for controlling an automobile air conditioner and, more particularly, to a controlling apparatus improved to facilitate the setting of operating condition or mode of the automobile air conditioner.

2. Description of the Prior Arts

In general, there are two ways of control of operating condition or operating mode of automobile air conditioner such as, for example, flow rate of the conditioned air: namely, a fixed or manual control mode in which the condition is set as desired by the user at one of three or four fixed levels such as Low, Medium, High and so forth and an automatic control mode in which one of these levels is selected automatically by means of an electric controller or the like device. Once one of these fixed levels is selected, this level is maintained fixedly until the other level is appointed manually or the automatic control mode is selected. More specifically, in the conventional controlling apparatus for automobile air conditioner in which the selection of the level is made by means of a lever through a controlling link mechanism, the lever has a mechanism to keep its position to maintain the selected condition or level of operation. This conventional arrangement imposes the following problem. Assume here that the driver wishes to restart the air conditioner after long parking of the automobile or after a suspension of operation of the air conditioner.

The driver will find that the condition or level of operation of the air conditioner, which was selected before parking or before stopping the air conditioner, is not suitable for the present demand for conditioned air. Then, the driver will be obliged to make a readjustment to select new condition or level of operation of the air conditioner.

In the case of the control of flow rate of air, since the lever for adjusting the air flow rate serves also as a manipulation switch for starting the air conditioner, the driver has to manipulate this lever after turning the main switch of the automobile on.

SUMMARY OF THE INVENTION

Accordingly, an object of the invention is to provide an apparatus for controlling an automobile air conditioner, incorporating electric controlling means such as a digital computer which is intended for a diversification of the controlling function, the apparatus being improved to overcome the above-described problem of the prior art and to permit an easy selection of the operating condition.

When the main switch of the automobile is turned on for starting the air conditioner or for the preparation for the operation of the air conditioner, the controlling apparatus selects the automatic control mode for automatically controlling the level of flow rate of conditioned air, so that, when the air conditioner is started, the optimum level is automatically selected in accordance with a predetermined controlling program.

More specifically, according to the invention, there is provided an apparatus for controlling the operation of an automobile air conditioner comprising a mode switch means including a plurality of self-resetting switches and adapted to selectively appoint one of manual control mode and automatic control mode for controlling the level of flow rate of conditioned air, memory means adapted to memorize the selected control mode in response to a signal from the mode switch means, and an electric control means adapted to transmit the signal from the mode switch means to the memory means for making the memory means memorize the selected control mode, and to control a control member of the air conditioner in accordance with the content of the memory means while setting a value representing the automatic control mode in the memory means when a main switch of the automobile is turned on.

Other objects, features and advantages of the invention will become more clear from the following description of the preferred embodiment taken in conjunction with the accompanying drawings.

BRIEF DESCRIPTION OF THE DRAWINGS

FIG. 1 shows the general arrangement of an apparatus in accordance with an embodiment of the invention; and FIGS. 2 and 3 are flow charts showing a series of operation of a digital computer incorporated in the apparatus shown in FIG. 1.

DESCRIPTION OF THE PREFERRED EMBODIMENT

Referring first to FIG. 1, a switch 1 is operatively connected to an engine ignition key switch of an automobile and adapted to open and close a power supply circuit between the battery BATT on the automobile and a control unit 3. The supply of the power from the battery to the control unit 3 is made through a constant voltage circuit 2.

The electronic control unit 3 is composed of a digital computer which is generally referred to as "microcomputer," and is adapted to actuate, through a group of actuators 4, respective control members 5 of a blower, inlet opening switching damper, outlet switching damper and compressor of refrigerator of the air conditioner, in accordance with a predetermined controlling program upon receipt of signals from various sensors 6 and a control panel 7. In FIG. 1, numeral 8 designates a passenger compartment. The actuator 4, control member 5 and sensor 6 are well known as shown, for example, in U.S. Pat. No. 4,316,251 to Saito et al.

The control unit 3 is further adapted to deliver a signal representing the states of the control members such as positions of the inlet and outlet dampers to the control panel 7 to selectively put on the indicator lamps on the control panel 7. The control panel 7 also has a plurality of manipulation switches besides the indicator lamps.

More specifically, the control panel has an automatic control mode switch (AUTO) 7a adapted to select the automatic mode of control of various controlling items such as suction of air, blow out of air and so forth, a switch 7b for stopping the operation of the air conditioner (OFF), a switch 7c for selecting and fixing the level of air flow rate at low level (Lo), a switch 7d for selecting and fixing the level of air flow rate at high level (Hi), a switch 7e for selecting and fixing the sucking condition for the sucking of external fresh air (FRS), a switch 7f for selecting and fixing the sucking condition for the recirculation of room air (REC), a switch 7g for selecting a dehumidification/room temperature control operation (A/C), a switch 7h for selecting an energy-saving room temperature control (ECONOMY), a switch 7i for selecting and fixing the air blow out condition for ventilation (VENT), a switch 7j for selecting and fixing the air blow out condition at bi-level (B/L), a switch 7k for selecting and fixing the air blow out condition for blowing into leg space (HEAT), a switch 7l for selecting and fixing the air blow out condition for defrosting (DEFROST), and a room temperature setting device 7m which includes a switch (UP) for raising the set room temperature at 0.5° C. interval, a switch (DOWN) for lowering the set room temperature at 0.5° C. interval and an indicator for indicating the set temperature digitally.

The switches mentioned above are self-resetting switches of push-button type. The switches AUTO, OFF, Lo and Hi (7a, 7b, 7c and 7d) are arranged in a group so that only one of them is selectable or operable at one time, and only one of the switch lamps is put on when the switch OFF is not selected. When the switch OFF is selected, all of the lamps and the room temperature indicator are turned off. Similarly, the switches FRS and REC constitute a group in which either one of these two switches is selectable. Also, the switches A/C and ECONOMY constitute a group, while another group is constituted by switches VENT, B/L, HEAT and DEF. In each group, one of the switch lamps is put on when the condition other than OFF is selected.

The controlling apparatus of this embodiment is continuously supplied with electric power from the battery BATT. As the power supply is connected, the digital computer 3 commences the operation in accordance with the control program shown in FIG. 2 starting with the start step START. The program then proceeds to a step 101 in which the digital computer 3 reads the signal from the switch 1. In the subsequent step 102, the digital computer 3 makes a judgement as to whether the key switch 1 takes the ON state or not. If the key switch is in OFF state, the program is returned to the step 101, whereas, when the key switch is in ON state, the program proceeds to the next step 103. In this step 103, a specific address group in the control panel S/W signal memory (random access memory (RAM, 3A) incorporated in the digital computer 3) sets the AUTO switch memory at "1" level as the content of this memory. This operation is conducted by the turning-on of the key switch, regardless of the operation of the control panel 7.

Subsequently to the operation of step 103, the digital computer reads in a step 104 the room temperature set signal and signals from various switches on the control panel 7, as well as signals from the group of sensors 6. These signals delivered to the digital computer 3 are stored in predetermined addresses in the random access memory.

The next step 105 is a step for judging whether the key switch has been turned from ON state to OFF state. If the answer is No, i.e. if the key switch has not been turned to OFF state, the program proceeds to the next step 106, whereas, if the answer is Yes, the program proceeds to a step 107. When one of the switches of the group constituted by switches AUTO, OFF, Lo and Hi 7a, 7b, 7c and 7d is turned on, only the switch memory corresponding to the turned switch is set at "1" level, while other switch memories are reset to "0" level. In the group of switches constituted by FRS and REC 7e and 7f, one of the switch memories is set at "1" level while the other is reset to "0" level as the corresponding switch is turned on. This applies also to the group constituted by the switches A/C and ECONOMY 7g and 7h, as well as to the group consisting of the switches VENT, B/L, HEAT and DEF 7i, 7j, 7k and 7l.

In the step 105, a judgement is made as to whether the key switch continues to take the ON state. If the switch has been turned off, the command value of room temperature obtained before turning the key switch off is fixed, and the operation of the actuators 4 and indication members (i.e., set temperature indicator and switch lamps) on the control panel 7 are stopped. The program then proceeds to the step 101 to prepare for the controlling operation.

In the step 106, a judgement is made as to whether the OFF state or mode of the air conditioner has been taken, i.e. as to whether the switch memory corresponding to the switch OFF takes the "1" level or "0" level. If the OFF state has been selected, the program advances to a step 108 in which the actuators and indications on the control panel are turned off, and the input values from the sensors 6, as well as the switch memories except the switch memory corresponding to the switch OFF, are cleared to "0". The program then returns to the step 104.

However, when the judgement in the step 106 proves that a condition other than OFF is taken, the program proceeds to a step 109 where a judgement is made as to whether the level of operation of the blower is fixed at Low (Lo). If the Lo level is confirmed, the program proceeds to a step 110, whereas, if the level of operation of blower is not fixed at Lo, the program proceeds to a step 111 in which a judgement is made as to whether the level of operation of blower is fixed at High (Hi) or not.

In the step 110, the instruction concerning the air flow rate, which is to be delivered to the actuator 4, is fixed at the level Lo, and the switch lamp Lo on the control panel 7 is put on, while other switch lamps of the same group, i.e. the switch lamps corresponding to the switches OFF, AUTO, and Hi are put off. The program is then advanced to a step 115. On the other hand, when the step 111 is taken, a judgement is made as to whether the blower operation is fixed at Hi. If the blower operation is not fixed at Hi, the digital computer 3 judges that the automatic mode AUTO has been selected and advances the program to a step 112 to turn on the switch lamp AUTO, while turning off the switch lamps corresponding to the switches OFF, Lo and Hi. Then, after conducting a process for controlling the air flow rate automatically in a step 114, the microcomputer advances the program to the aforementioned step 115. In the step 114, the air flow rate is automatically determined by a method known per se in accordance with the signals from the sensors 6, and an instruction corresponding to the thus determined flow rate is given to the actuator 4. The operation of the actuator 4 in accordance with the signals from the sensor 6 is well known as shown, for example, in U.S. Pat. No. 4,311,188 to Kojima et al. On the other hand, if the judgement made in the step 111 proves that the blower operation is fixed at Hi, the instruction concerning the air flow rate, which is to be delivered to the actuator 4, is set at Hi level (maximum level), and the switch lamp Hi on the control panel 7 is turned on while the other switch lamps OFF, AUTO, and Lo are turned off.

As will be understood from the foregoing description, in the controlling apparatus of the invention, the AUTO switch memory corresponding to the switch AUTO for automatic control of air flow rate is set without fail at "1" level in the step 103, immediately after the key switch is turned on. Therefore, when the air conditioner is started, the air flow rate is controlled automatically by the step 114, unless the switch OFF 7b, switch Lo 7c or the switch Hi 7c is turned on manually after the start of the air conditioner. Therefore, the user need not make the effort of manipulating the switches for selecting the operating condition of the air conditioner, in addition to the turning on of the key switch.

The following steps 115 thru 119 are for conducting the control of the suction of air. Namely, in the step 115, a judgement is made as to whether the condition FRS is selected, i.e. whether the introduction of external fresh air has been selected. If the answer is Yes, the program proceeds to a step 116, whereas, if the answer is No, the program proceeds to a step 117 in which a judgement is made as to whether the condition REC, i.e. the recycling of room air, is selected. If the condition REC has been selected, the program is advanced to a step 118 whereas, when the condition REC has not been selected, the digital computer regards the condition as being the automatic control mode for controlling the state of the suction of air, and proceeds the program to a step 119. In each of the steps 116, 118 and 119, the air inlet or suction opening is determined at the selected position (step 116 or 118) or controlled automatically (step 119) while turning on or off the switch lamps REC and FRS. The automatic control of the suction of air in the step 119 is conducted by a known automatic control program.

In the subsequent steps 120 to 124, the digital computer makes a decision as to which one of the dehumidfying mode, energy-saving mode without operating compressor and known AUTO mode in which the dehumidifying mode and energy saving mode are automatically selected should be adopted in the room temperature control, in accordance with the contents of the A/C switch memory and the ECONOMY switch memory. The result of the decision is delivered as an instruction to the actuator 4. At the same time, the switch lamp A/C and the switch lamp ECONOMY on the control panel 7 are turned on or off.

The subsequent steps 125 thru 133 are for effecting the control of the state of the outlet of the conditioned air. More specifically, in each of a series of steps 125, 127, 129 and 131, judgement is made as to which one of the conditions VENT, B/L, HEAT and DEF is selected, from the content of the corresponding switch memory. Then, if any one of these conditions has been selected, the digital computer gives an instruction to the actuator 4 to obtain the selected condition of the air outlet, in the corresponding step 126, 128, 130 or 132. Simultaneously, the switch lamps VENT, B/L, HEAT and DEF are turned on and off. If none of these conditions of air outlet has been selected, the digital computer takes it as being the AUTO mode, and determines in a step 133 the optimum condition of air outlet corresponding to the signals from the sensors 6, in accordance with a controlling method which is known per se. The results of this determination is delivered to the actuator 4 for realizing the determined condition of the air outlet and also to the control panel 7.

In the final step 134, various known controls concerning the automobile air conditioner are performed and, then, the digital computer 3 conducts the processing of the aforementioned program starting from the step 104.

Since this program is conducted repeatedly, the air conditioner controlling apparatus is automatically set for the automatic control mode AUTO as the key switch is turned on, even though the control panel 7 is not manipulated, so that the condition of sucking of air, condition of blowing out of the conditioned air, flow rate of the air and the room temperature are controlled fully automatically. At the same time, the switch lamps, i.e. the indicator lamps, on the control panel are selectively turned on and off to inform the driver of the mode or condition of operation of the air conditioner. Then, as the control panel is manipulated by the driver as desired to select a certain condition, the automatic control is disabled to permit the air conditioner to be operated manually to the selected condition, while the switch lamp AUTO on the control panel is turned off.

Although the invention has been described in specific terms, the described embodiment is not exclusive and various changes and modifications may be imparted thereto.

For instance, it is possible to effect the following modifications.

(1) Instead of using a single switch AUTO for selecting the automatic control mode, it is possible to provide individual switches such as AUTO for each of the controlling items, such as AUTO switch for automatically controlling the operation of the blower, AUTO switch for automatically controlling the state of suction of air, AUTO switch for automatically controlling the state of outlet of conditioned air and an AUTO switch for automatically controlling the room temperature.

(2) Besides the random access memory in the microcomputer, it is possible to use a memory device installed externally of the microcomputer.

(3) It is possible to use a combination of hard-wired electronic circuits in place of the microcomputer.

As has been described, the present invention provides an apparatus for controlling the operation of automobile air conditioners, capable of permitting easy manipulation of the air conditioner while overcoming the aforementioned problem of the prior art.

What is claimed is:

1. An apparatus for controlling the operation of an automobile air conditioner having a control member for controlling flow rate of air supplied into a passenger compartment of the automobile, comprising:

mode switch means including a plurality of switches, said plurality of switches including a first switch for sending a first signal to a memory means which represents setting of an automatic control mode, and a second switch for sending a second signal to said memory means which represents setting of a manual control mode;

a main switch of the automobile;

sensor means for sending a signal to an electric controlling means for varying the flow rate of air controlled by said control member;

memory means for receiving said first and second signals from said mode switch means and selectively and respectively memorizing first and second data in response thereto, and for memorizing said first data when said main switch is turned on; and electric controlling means for controlling said control member to make the flow rate of air have a value corresponding to the signal from said sensor means when said first data is memorized in said memory means, and for controlling said control member to make the flow rate of air have a predetermined value when said second data is memorized in said memory means.

2. An apparatus as in claim 1, wherein
said electric controlling means includes a digital computer, and
said memory means includes a memory unit incorporated in said digital computer.

3. An apparatus as in claim 1, wherein
said main switch includes an ignition key switch.

* * * * *